United States Patent [19]

Schilling

[11] Patent Number: 5,081,643
[45] Date of Patent: Jan. 14, 1992

[54] SPREAD SPECTRUM MULTIPATH RECEIVER APPARATUS AND METHOD

[75] Inventor: Donald L. Schilling, Sands Point, N.Y.

[73] Assignee: SCS Mobilecom, Inc., Port Washington, N.Y.

[21] Appl. No.: 614,827

[22] Filed: Nov. 16, 1990

[51] Int. Cl.$^5$ .............................................. H04K 1/00
[52] U.S. Cl. ......................................................... 375/1
[58] Field of Search ............................................ 375/1

[56] References Cited

U.S. PATENT DOCUMENTS

| | | | |
|---|---|---|---|
| 4,164,628 | 8/1979 | Ward et al. | 375/1 |
| 4,612,652 | 9/1986 | Kadin | 375/1 |
| 4,694,467 | 9/1987 | Mui | 375/1 |
| 4,761,796 | 8/1988 | Dunn et al. | 375/1 |
| 4,914,699 | 4/1990 | Dunn et al. | 375/1 |
| 4,984,247 | 1/1991 | Kaufmann et al. | 375/1 |

Primary Examiner—Thomas H. Tarcza
Assistant Examiner—David Cain
Attorney, Agent, or Firm—David B. Newman, Jr. & Associates

[57] ABSTRACT

An apparatus for adapting to receive a particular path, having the greatest amplitude, of a spread-spectrum signal with multipath. The spread-spectrum signal is modulated by a chip-code. A chip-code generator generates a chip-code signal having the same chip-code as the spread-spectrum signal. A plurality of shift registers shift the chip-code signal by a plurality of time delays. First and second ring counters generate first and second sequencing signals for controlling first and second switching devices. The first switching device successively switches between a plurality of taps of the shift registers in a direction of increasing or decreasing delays for generating the chip-code signal with the first time delay. The second switching device successively switches between the plurality of taps of the shift registers in a direction of increasing or decreasing delays for generating the chip-code signal with a second time delay. A first correlator correlates the spread-spectrum signal received at the input with the chip-code signal with the first time delay. A second correlator correlates the spread-spectrum signal received at the input with the chip-code signal with the second time delay. A comparator generates first and second comparator signals by comparing the outputs of the first correlator and the second correlator.

12 Claims, 3 Drawing Sheets

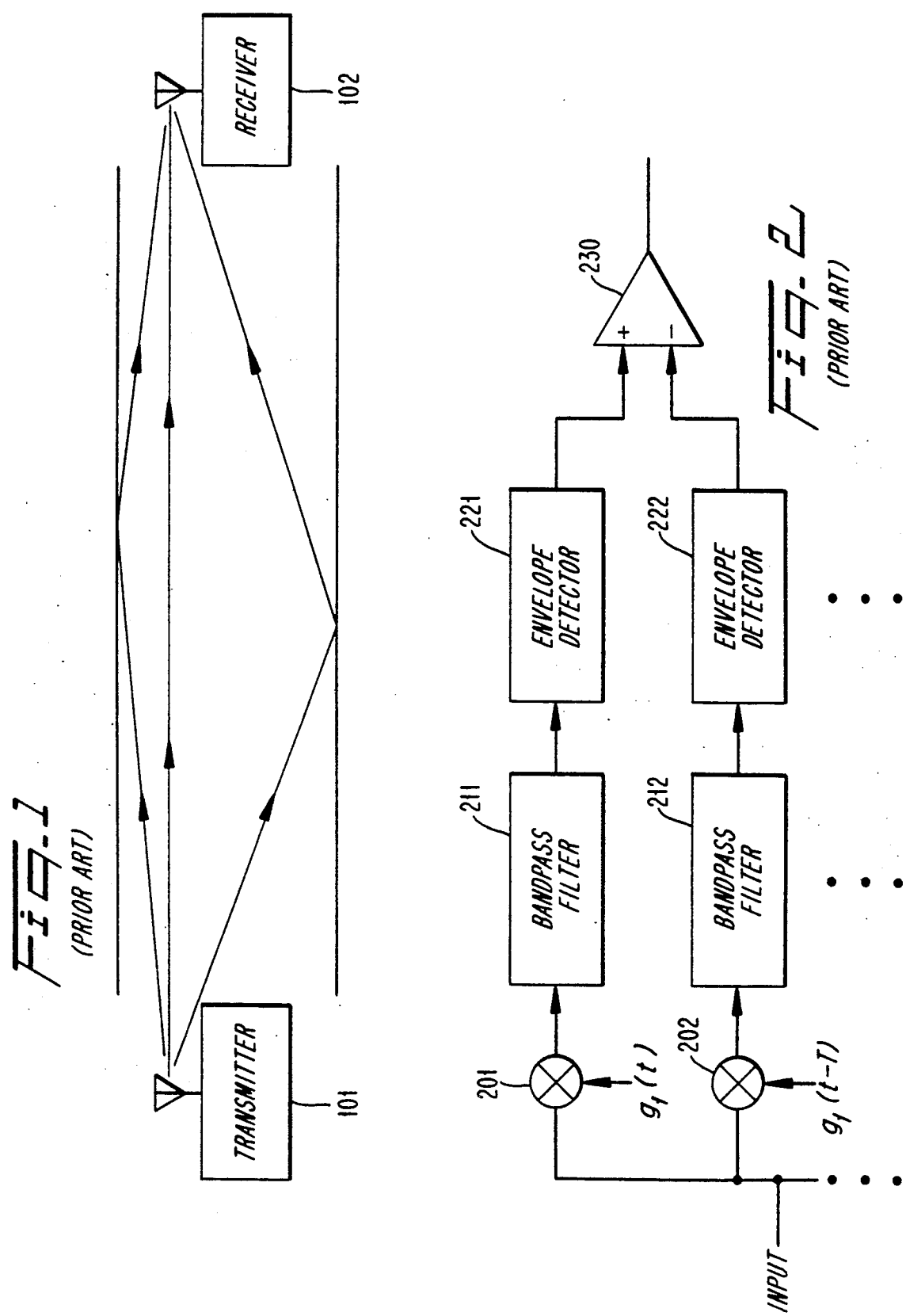

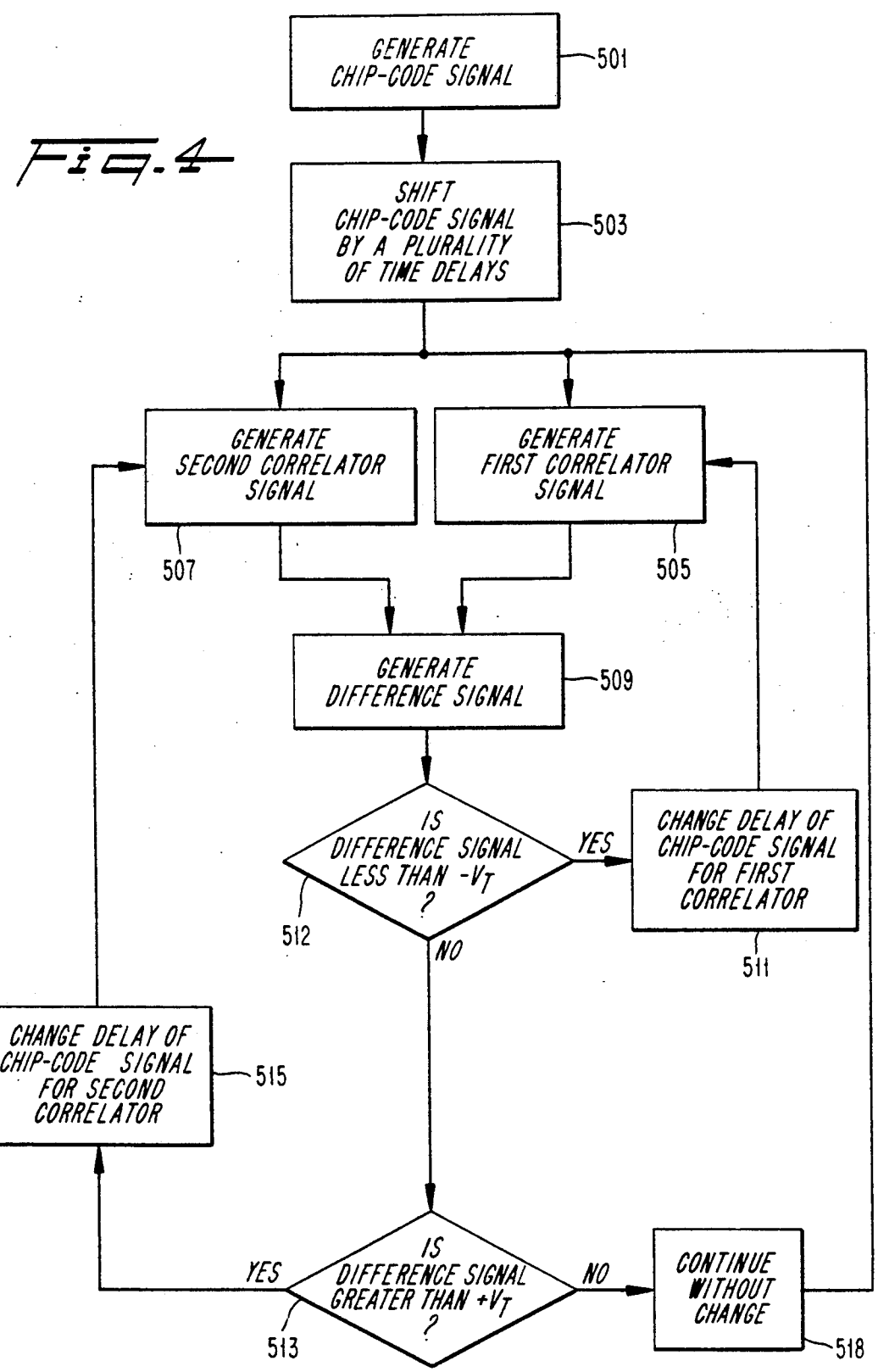

SPREAD SPECTRUM MULTIPATH RECEIVER APPARATUS AND METHOD

BACKGROUND OF THE INVENTION

This invention relates to spread spectrum communications, and more particularly to an apparatus and method for adapting to multipath on a spread-spectrum signal.

DESCRIPTION OF THE PRIOR ART

When a signal is transmitted through a communications channel, the signal may experience multiple reflections. The multiple reflections are known as multipath. In an urban environment, and at VHF, UHF or microwave radio frequencies, the multipath may be due to multiple reflections from buildings when transmitting the signal between buildings. If a communications system were deployed inside a building, then multipath may result from multiple reflections between floors, walls and more generally, any of the structure of the building.

FIG. 1 illustratively shows a transmitter 101 transmitting through a communications channel to a receiver 102, where the signal has a direct path and two reflected paths. The multipath results in the transmitted signal arriving at the receiver 102 with differing time delays. The differing time delays may lead to intersymbol interference, since a delayed version of the received signal may extend into a subsequent sampling interval and overlap a subsequent symbol. The multipath effect is well known in television, where it manifests itself as ghost images.

Spread-spectrum modulation offers many advantages as a communications system for an office or urban environment. These advantages include reducing intentional and unintentional interference, combating multipath problems, and providing multiple access to a communications system shared by multiple users. Commercially, these applications include, but are not limited to, local area networks for computers and personal communications networks for telephone, as well as other data applications.

A spread-spectrum signal typically is generated by modulating an information-data signal with a chip-code signal. The information-data signal may come from a data device such as a computer, or an analog device which outputs an analog signal which has been digitized to an information-data signal, such as voice or video. The chip-code signal is generated from a chip-code where the time duration, $T_c$, of each chip is usually substantially less than, but may be less than or equal to, the time duration of a data bit or data symbol.

Spread spectrum provides a means for communicating in which a spread-spectrum signal occupies a bandwidth in excess of, or equal to, the minimum bandwidth necessary to send the same information. The band spread is accomplished using a chip-code signal which is independent of an information-data signal. A synchronized reception with the chip-code signal at a receiver is used for despreading the spread-spectrum signal and subsequent recovery of data from the spread-spectrum signal.

Due to multipath, multiple reflections of the spread-spectrum signal arrive at a receiver with different time delays, $T_i$, which may be less than, greater than, or equal to the time duration, $T_c$, of a chip of the chip-code signal. When they occur with a time delay $T_i > T_c$ the multipath signals appear as noise to the synchronized spread-spectrum signal. One or more multipath signals, however, may have an amplitude greater than the amplitude of the spread spectrum signal to which the receiver is synchronized. Furthermore, the amplitudes of the various multipath spread spectrum signals may vary over time, since the particular path of the multipath signal having the greatest amplitude depends on receiver location and other factors. Increased receiver performance can be obtained if the receiver could adapt to receiving the particular multipath spread spectrum signal having the greatest amplitude.

For example, for a particular application, a chip may have a time duration, $T_c$, of 40 nanoseconds. This time duration can be less than some of the multiple time delays, $T_i$, of the multiple reflections of the spread-spectrum signal arriving at the receiver from multipath. For an information-data signal, $d_1(t)$, a chip-code signal, $g_1(t)$, and carrier frequency, $w_o$, the received spread-spectrum signal, $x_r(t)$, has the form:

$$x_r(t) = \sum_i d_1(t)[a_i g_1(t - T_i)\cos(w_o t + \theta_i)]$$

where $a_i$ and $T_i$ are attenuation and time duration of each path of the multipath reflections. $\theta_i = -w_o T_i$ and the i = time delay in the data are neglected, i.e., the maximum multipath delay is assumed to be much less than the duration of a bit.

A solution to the multipath problem is to despread the received spread-spectrum signal with the chip-code signal, $g_1(t)$, using multiple delays. FIG. 2 shows an apparatus where a spread-spectrum signal from an input is despread using a plurality of product devices 201, 202, ..., and a plurality of delayed chip-code signals $g_1(t)$, $g_1(t-T)$, ..., $g_1(t-nT)$, which pass through a plurality of bandpass filters 211, 212, ..., and envelope detectors 221, 222, ..., respectively. The resulting outputs from the envelope detectors are compared using comparator 230. The apparatus compares the outputs of the plurality of envelope detectors using comparator 230, and selects the output signal with the largest signal strength.

The prior art apparatus of FIG. 2 requires a large number of correlators or bandpass filters and envelope detectors. Also, a circuit is required for selecting the output signal having the strongest signal strength.

OBJECTS OF THE INVENTION

An object of the invention is to provide an apparatus and method for receiving a particular path of a multipath spread-spectrum signal, having the greatest amplitude.

Another object of the invention is to provide a spread-spectrum apparatus and method which can adapt or select to receive a spread-spectrum signal arriving at a receiver with an arbitrary delay.

A further object of the invention is a spread-spectrum apparatus and method which adapts or compensates for multipath without requiring a large number of correlators for despreading the spread-spectrum signal.

A still further object of the invention is a spread-spectrum apparatus and method which adapts or selects to receive a particular path, having the greatest amplitude, of a spread spectrum signal with multipath, using a simple circuit for determining which of the spread-spectrum signals from the multipath arrives with the strongest signal strength.

An additional object of the invention is an apparatus and method for adapting or compensating for multipath on a spread-spectrum signal which is easy to implement.

SUMMARY OF THE INVENTION

According to the present invention, as embodied and broadly described herein, an apparatus for adapting or selecting to receive a particular path, having the greatest amplitude, of a spread-spectrum signal with multipath is provided comprising chip means, delay means, switching means, correlator means and comparator means. The switching means may be first switching means and second switching means, and correlator means may be first correlator means and second correlator means. The spread-spectrum signal is modulated by a chip code.

The delay means operatively is coupled to the chip means, and has a plurality of taps corresponding to a plurality of the time delays. The first switching means and the second switching means operatively are coupled to the plurality of taps of the delay means. The first correlator means operatively is coupled to the input and to the first switching means. The second correlator means operatively is coupled to the input and to the second switching means. The first correlator means and the second correlator means include product devices, bandpass filters, and detectors. The comparator means operatively is coupled between the first correlator means, the second correlator means, the first switching means and the second switching means.

The chip means generates a chip-code signal which has the same chip code as the spread-spectrum signal. The delay means shifts the chip-code signal from the chip means by a plurality of time delays, with each time delay typically having a duration equal to a time period of one chip of the chip-code signal.

The first correlator means generates the first correlation signal by correlating the spread-spectrum signal received at the input with the chip-code signal, from the first switching means. The second correlator means generates a second correlation signal by correlating the spread-spectrum signal received at the input with the chip-code signal, from the second switching means.

In response to a first correlation signal having a voltage level greater than a second correlation signal and a first threshold, the comparator means outputs a first comparator signal, which causes the second switching means to successively switch between the plurality of taps of the delay means in a direction of either increasing or decreasing delay. The first switching means outputs the chip-code signal with a first time delay. The first time delay may have any time duration from the delay means. In this state, when the first correlation signal has a voltage level less than the first threshold and second correlation signal, and greater than a second threshold, the second switching means continues switching between the plurality of taps.

In response to the first correlation signal having a voltage level less than the second correlation signal and a second threshold, the comparator means outputs a second comparator signal, which causes the first switching means to successively switch between the plurality of taps in a direction of either increasing or decreasing delay. The second switching means outputs the chip-code signal with a second time delay. The second delay may have any time duration from the delay means. In this state when the second correlation signal has a voltage level greater than the first correlation signal and the second threshold, and less than the first threshold, the first switching means continues switching between the plurality of taps.

The present invention also includes a method for adapting or selecting to receive a particular path, having the greatest amplitude, of a spread-spectrum signal with multipath. The method uses chip means, delay means, switching means, correlator means and comparator means. As set forth above, the switching means may be embodied as first switching means and second switching means, and correlator means may be embodied as first correlator means and second correlator means. The spread-spectrum signal is modulated by a chip code.

The method comprises the steps of generating with the chip means a chip-code signal having the same chip code as the spread-spectrum signal, and shifting with the delay means the chip-code signal by a plurality of time delays. The method correlates with the correlator means the spread-spectrum signal with the chip-code signal. The first correlation signal is generated from correlating the spread-spectrum signal with the chip-code signal with the first time delay, and the second correlation signal is generated from correlating the spread-spectrum signal with the chip-code signal with the second time delay. A difference signal is generated from the first correlation signal and the second correlation signal. In response to the difference signal having a voltage level greater than a first threshold, the method changes with the switching means a time delay of a chip-code signal with a second time delay and, in response to the difference signal having a voltage level less than a second threshold, the method changes with the switching means a time delay of a chip-code signal with a first time delay.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 1 illustrates multipath;

FIG. 2 is block diagram of a spread spectrum receiver a having envelope detectors;

FIG. 4 is a flow chart of the method of the present invention.

DETAILED DESCRIPTION OF THE PREFERRED EMBODIMENTS

Figure 3:
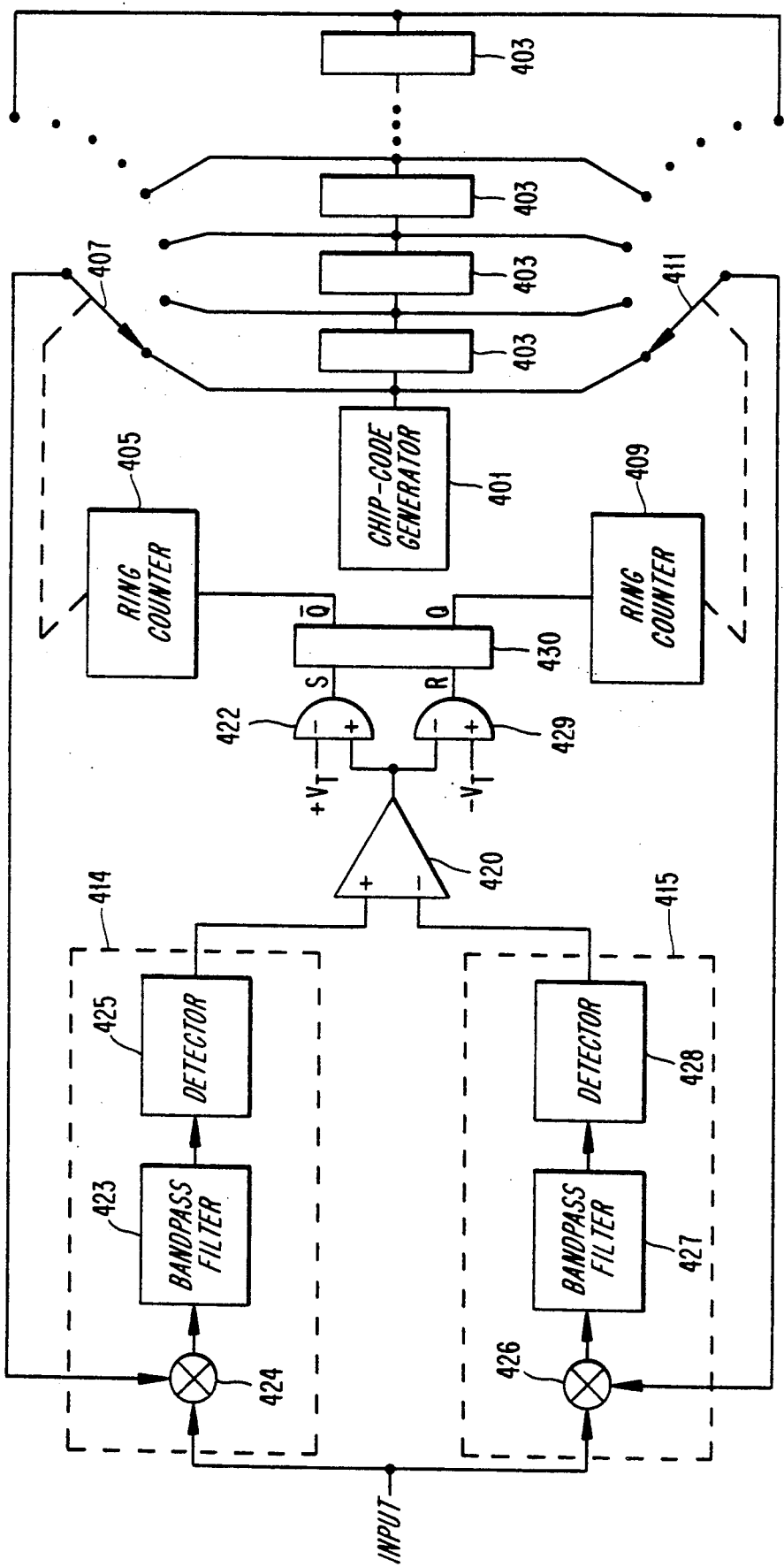
FIG. 3 shows a spread spectrum receiver according to the present invention.

Reference will now be made in detail to the present preferred embodiments of the invention, examples of which are illustrated in the accompanying drawings, wherein like reference numerals indicate like elements throughout the several views.

As illustratively shown in FIG. 3, an apparatus for adapting or selecting to receive a particular path, having the greatest amplitude, of a spread-spectrum signal with multipath is shown comprising chip means, delay means, switching means, correlator means and comparator means. To better understand the invention, the switching means may be considered as first switching means and second switching means, and correlator means may considered as first correlator means and second correlator means. The spread-spectrum signal is modulated by a chip-code signal.

In the exemplary arrangement shown, the chip means is embodied as chip-code generator 401, the delay means is embodied as a plurality of shift registers 403. The first switching means is embodied as a first ring counter 405 and a first switching device 407. The second switching means is embodied as a second ring counter 409 and a second switching device 411. Although shown in FIG. 3 as a rotating switch, the first switching device 407 and the second switching device 411 would be implemented using electronic circuits such as integrated circuits, microelectronic circuits, or as part of a processor chip or gate array.

The first correlator means is shown as a first correlator 414 and the second correlator means is shown as a second correlator 415. The first correlator 414 may employ a first product device 424 coupled through a first bandpass filter 423 to a first detector 425. The second correlator 415 may employ a second product device 426 coupled through a second bandpass filter 427 to a second detector 428. Envelope detectors or square law detectors, by way of example, may be used for the first detector 425 and the second detector 428. Coherent or noncoherent detectors using in-phase and quadrature-phase detection may be employed. Other circuits may be used for implementing the first correlator means and the second correlator means, as is well known in the art.

The comparator means is embodied as a differential amplifier 420, a first comparator 422, a second comparator 429 and flip-flop circuit 430. Differential amplifiers, a processor or other circuits well known in the art which perform a comparing function may be employed for the comparator means.

The plurality of shift registers 403 operatively is coupled to the chip-code generator 401. The first switching device 407 and the second switching device 411 operatively are coupled to the plurality of taps of the plurality of shift reqisters 403. The first correlator 414 operatively is coupled to the input and to the first switching device 407. The second correlator 415 is operatively coupled to the input and to the second switching device 411. The differential amplifier is operatively coupled to the first correlator 414 and the second correlator 415. The first comparator 422 operatively is coupled to differential amplifier 420 and to flip-flop circuit 430. The second comparator 429 is operatively coupled to differential amplifier 420 and to flip-flop circuit 430. The flip-flop circuit 430 is coupled to the first ring counter 405 and to the second ring counter 409.

The chip-code generator 401 generates a chip-code signal having the chip code of the spread-spectrum signal. The plurality of shift registers 403 shifts the chip-code signal from the chip-code generator 401 by a plurality of time delays. The duration of a time delay may be set to any desirable length. In a typical embodiment, each time delay would have a duration equal to a time period of one chip of the chip-code signal. The plurality of shift registers 403 has a plurality of taps corresponding to each of the time delays. Five or six time delays typically may be used for a particular application, although there is no theoretical limitation.

The first correlator 414 generates a first correlation signal by correlating the spread-spectrum signal received at the input, with the chip-code signal having the first time delay. The first correlator 414 multiplies the spread-spectrum signal with the chip-code signal with the first time delay, using product device 424, and filters and detects the product with first bandpass filter 423 and first detector 425, respectively. Equivalent circuits for the first correlator 414 are well known in the art.

The second correlator 415 generates a second correlation signal by correlating the spread-spectrum signal received at the input, with the chip-code signal having the second time delay. The second correlator 415 multiplies the spread-spectrum signal from the input with the chip-code signal having the second time delay, using second product device 426, and filters and detects the product with second bandpass filter 427 and second detector 428, respectively. Equivalent circuits for the second correlator are well known in the art.

The differential amplifier 420 subtracts the second correlation signal from the first correlation signal to produce a difference signal. In response to the difference signal having a voltage level greater than a first threshold, $V_T$, the first comparator 422 outputs a first comparator signal. The first comparator signal may be a pulse or a voltage level which sets flip-flop circuit 430. The output of flip-flop 430 causes the second ring counter 409 to generate a second sequencing signal. The second sequencing signal drives the second switching device 411 to successively switch between the plurality of taps of the plurality of shift registers 403 in a direction of either increasing or decreasing delay. In this state, when the difference signal has a voltage level less than the first threshold, $V_T$, and greater than a second threshold, $-V_T$, the flip-flop circuit 430 continues to drive the second ring counter 409 to continue outputting the second sequencing signal. Accordingly, the second switching device 411 continues to switch between the plurality of shift registers 403, when the difference signal has a value less than the first threshold, $V_T$, and greater than a second threshold, $-V_T$.

The first switching device 407 continuously outputs the chip-code signal with a first time delay, while the second switching device 411 is switching between the taps of the plurality of shift registers 403. The first time delay may have any time duration from the plurality of shift registers 403, including a delay of zero.

In response to difference signal having a voltage level less than a second threshold, $-V_T$, the second comparator 429 outputs a second comparator signal. The second comparator signal may be a pulse or voltage level which resets flip-flop circuit 430. The output of flip-flop circuit 430 causes the first ring counter 405 to generate a first sequencing signal. The first sequencing signal drives the first switching device 407 to successively switch between the plurality of taps in a direction of either increasing or decreasing delay. In this state, when the difference signal has a voltage level greater than the second threshold, $-V_T$, and less than the first threshold, $V_T$, the flip-flop circuit 430 continues to drive the first ring counter 405 to continue outputting the first sequencing signal. Accordingly the first switching device 407 continues to switch between the plurality of shift registers 403, when the difference signal has a value greater than the second threshold, $-V_T$, and less than the first threshold, $V_T$.

The second switching device 411 continuously outputs the chip-code signal with the second time delay, while the first switch device 407 is switching between the tops of the plurality of shift register 403, including a delay of zero.

In a multipath application, having the first threshold set at the same value as the second threshold, such as zero volts, may be undesirable since the first comparator 422 and the second comparator 429 may continuously flip between the second ring counter 405 and the first ring counter 409. The continuous flipping between the first switching device 407 and the second switching device 411, would cause continuous adjusting the delays in the chip-code signal from the first correlator 414 and the second correlator 415.

In a preferred embodiment, the first threshold would not have the same value as the second threshold. As shown in FIG. 3, the second threshold may have a value which is the negative of the first threshold. With these threshold settings, a region exists between the first threshold and the second threshold for which the first comparator 422 and the second comparator 429 would not switch operation between the second switching device 411 and the first switching device 407. In this region the multipath is not varying enough to warrant adjusting the delay by changing switching devices.

The present invention also includes a method for adapting or selecting to receive a particular path, having the greatest amplitude, of a spread-spectrum signal with multipath. The method uses chip means, delay means, switching means, correlator means and comparator means. As set forth above, the switching means may be embodied as first switching means and second switching means, the correlator means may be embodied as first correlator means and second correlator means, and the comparator means may be embodied as first and second comparator means. The method may be implemented using integrated circuits, microelectronics, a processor chip, gate array or other devices known to a person skilled in the art. The spread-spectrum signal is modulated by a chip code.

In the exemplary flow chart of FIG. 4, the method comprises the steps of generating 501 with the chip means a chip-code signal having the chip code of the spread-spectrum signal, and shifting 503 with the delay means the chip-code signal by a plurality of time delays. The method generates 505 using first correlator means, a first correlation signal by correlating the spread-spectrum signal with the chip-code signal having a first time delay, and generates 507 using second correlator means, a second correlation signal by correlating the spread-spectrum signal with the chip-code signal having a second time delay. The method generates 509 a difference signal by subtracting the second correlation signal from the first correlation signal.

The method determines 512 whether the difference signal has a voltage level less than a second threshold, $-V_T$. If the voltage level of the difference signal is less than the second threshold, $-V_T$, then the method, using switching means, changes 511 continually the time delay of the chip-code signal having the first time delay. The chip-code signal with the second time delay is correlated with the spread-spectrum signal to generate 507 the second correlation signal. The change 511 in the first time delay may be either an increase or decrease in time delay.

If the voltage level of the difference signal is greater than a first threshold, $V_T$, then the method, using switching means, changes 515 the time delay of the chip-code signal with the second time delay. The chip-code signal with the first time delay is correlated with the spread-spectrum signal to generate 505 the first correlation signal. The change 515 in the second time delay may be either an increase or decrease in time delay. Otherwise, the method continues 518 without change.

If the voltage level of the difference signal is between the first threshold and the second threshold, then the switching means continues changing the time delay of the chip-code with which it was changing prior to varying between the first threshold and the second threshold. Thus, if the voltage level of the difference signal were greater than the first threshold and takes on a value between the first threshold and the second threshold, then the method continues changing the time delay of the chip-code signal having the second time delay. Similarly, if the voltage level of the difference signal were less than the second threshold and takes on a value between the first threshold and the second threshold, then the method continues to change the time delay of the chip-code signal having the first time delay.

In use, consider a spread spectrum communication system operating over a channel which has more than one path linking a transmitter to a receiver, as shown in FIG. 1. These different paths might be several discrete paths, each with a different attenuation and time delay, or a continuum of paths. The present invention, using comparator means, has the effect of selecting the output signal from first and second correlator means with the largest signal strength.

It will be apparent to those skilled in the art that various modifications can be made to the spread spectrum multipath compensation apparatus and method of the instant invention with out departing from the scope or spirit of the invention, and it is intended that the present invention cover modifications and variations of the spread spectrum multipath compensation apparatus and method provided they come in the scope of the appended claims and their equivalents.

I claim:

1. An apparatus having an input, for adapting to receive a particular path, having the greatest amplitude, of a spread-spectrum signal with multipath, said spread-spectrum signal modulated by a chip-code signal, comprising:

a chip-code generator for generating the chip-code signal having the same chip code as the spread-spectrum signal;

a plurality of shift registers operatively coupled to said chip-code generator for shifting said chip-code signal by a plurality of time delays, each time delay having a duration equal to a time period of one chip of said chip-code signal, said plurality of shift registers having a plurality of taps corresponding to each of said time delays;

a first ring counter responsive to a second comparator signal for generating a first sequencing signal;

a first switching device operatively coupled to said first ring counter and to the plurality of taps of said plurality of shift registers, said first switching device responsive to said first sequencing signal for successively switching between said plurality of taps for changing a delay of the chip-code signal with a first time delay;

a second ring counter responsive to a first comparator signal for generating a second sequencing signal;

a second switching device operatively coupled to said second ring counter and to the plurality of taps of said plurality of shift registers, said second switching device responsive to said second sequencing signal for successively switching between said plurality of taps for changing a delay of the chip-code signal with a second time delay;

a first correlator operatively coupled to said input and to said first switching device for generating a first correlation signal by correlating said spread-spectrum signal received at said input with said chip-code signal having the first time delay;

a second correlator operatively coupled to said input and to said second switching device for generating a second correlation signal by correlating said spread-spectrum signal received at said input with said chip-code signal having the second time delay;

a difference amplifier for subtracting the second correlation signal from the first correlation signal;

a first comparator operatively coupled to said difference amplifier for generating the first comparator signal when said difference signal is greater than a first threshold; and a second comparator operatively coupled to said difference amplifier for generating the second comparator signal when said difference signal is less than a second threshold.

2. An apparatus having an input, for adapting to receive a particular path, having the greatest amplitude, of a spread-spectrum signal with multipath, said spread-spectrum signal modulated by a chip-code signal, comprising:

chip means for generating the chip-code signal having same the chip-code as the spread-spectrum signal;

delay means operatively coupled to said chip means for shifting said chip-code signal by a plurality of time delays, each time delay having a duration equal to a time period of one chip of said chip-code signal, said delay means having a plurality of taps corresponding to each of said time delays;

first switching means operatively coupled to the plurality of taps of said delay means, said first switching means responsive to a second comparator signal, for successively switching between said plurality of taps for changing a delay of the chip-code signal with a first time delay;

second switching means operatively coupled to the plurality of taps of said delay means, said second switching means responsive to a first comparator signal, for successively switching between said plurality of taps for changing a delay of the chip-code signal with a second time delay;

first correlator means operatively coupled to said input and to said first switching means for generating a first correlation signal by correlating said spread-spectrum signal received at said input with said chip-code signal having a first time delay;

second correlator means operatively coupled to said input and to said second switching means for generating a second correlation signal by correlating said spread-spectrum signal received at said input with said chip-code signal; and comparator means operatively coupled to said first correlator means and said second correlator means for generating the first comparator signal when a difference of said first correlation signal and said second correlation signal is greater than a first threshold, and for generating the second comparator signal when a difference of said first correlation signal and said second correlation signal is less than a second threshold.

3. An apparatus having an input for adapting to receive a particular path, having the greatest amplitude, of a spread-spectrum signal with multipath, said spread-spectrum signal modulated by a chip-code signal, comprising:

chip means for generating the chip-code signal having the same chip-code as the spread-spectrum signal;

delay means for shifting said chip-code signal by a plurality of time delays, said delay means having a plurality of taps corresponding to each of said time delays;

first switching means responsive to a second comparator signal for successively switching between said plurality of taps for changing a delay of the chip-code signal with a first time delay;

second switching means responsive to a first comparator signal for successively switching between said plurality of taps for changing a delay of the chip-code signal with a second time delay;

first correlator means for generating a first correlation signal by correlating said spread-spectrum signal received at said input with said chip-code signal having a first time delay;

second correlator means for generating a second correlation signal by correlating said spread-spectrum signal received at said input with said chip-code signal; and first comparator means for generating the first comparator signal when said first correlation signal is greater than said second correlation signal; and second comparator means for generating the second comparator signal when said first correlation signal is less than a second correlation signal.

4. The apparatus as set forth in claim 3 wherein:

said first switching means includes a first ring counter and first switching device, said first ring counter responsive to the second comparator signal for generating a first sequencing signal and said first switching device responsive to said first sequencing signal for successively switching between said plurality of taps in a direction of decreasing or increasing delay for changing a delay of the chip-code signal with a first time delay; and said second switching means includes a second ring counter and a second switching device, said second ring counter responsive to the first comparator signal for generating a second sequencing signal and said second switching device responsive to said second sequencing signal for successively switching between said plurality of taps in a direction of decreasing or increasing delay for changing a delay of the chip-code signal with a second time delay.

5. The apparatus as set forth in claim 3 wherein:

said first correlator means includes a first correlator, said first correlator operatively coupled to said input and to said first switching means for generating a first correlator signal by correlating said spread-spectrum signal received at said input with said chip-code signal having the first time delay; and said second correlator means includes a second correlator, said second correlator operatively coupled to said input and to said second switching device for generating a second correlator signal by correlating said spread-spectrum signal received at said input with said chip-code signal having the second time delay.

6. The apparatus as set forth in claim 3 wherein:
said comparator means includes a comparator, said comparator operatively coupled to said first correlator means and said second correlator means for generating the first comparator signal and the second comparator signal by comparing said first correlation signal with said second correlation signal.

7. An apparatus having an input for adapting to receive a particular path, having the greatest amplitude, of a spread-spectrum signal with multipath, said spread-spectrum signal modulated by a chip-code signal, comprising:
chip means for generating the chip-code signal having the chip code of the spread-spectrum signal;
delay means for shifting said chip-code signal by a plurality of time delays, said delay means having a plurality of taps corresponding to each of said time delays;
switching means responsive to a comparator signal having a level less than a predetermined threshold for successively switching between said plurality of taps for changing a delay of the chip-code signal with a first time delay and responsive to the comparator signal having a level greater than said predetermined threshold for successively switching between said plurality of taps for changing a delay of the chip-code signal with a second time delay;
correlator means for generating a first correlator signal by correlating said spread-spectrum signal received at said input with said chip-code signal having a first time delay and for generating a second correlator signal by correlating said spread-spectrum signal received at said input with said chip-code signal; and
comparator means for generating the comparator signal by comparing said first correlation signal with said second correlation signal.

8. The apparatus as set forth in claim 7 wherein:
said switching means includes a first ring counter, a first switching device, a second ring counter and a second switching device, said first ring counter responsive to the comparator signal having a level less than said predetermined threshold for generating a first sequencing signal and said first switching device responsive to said first sequencing signal for successively switching between said plurality of taps for changing a delay of the chip-code signal with a first time delay, said second ring counter responsive to the comparator signal having a level greater than said predetermined threshold for generating a second sequencing signal and said second switching device responsive to said second sequencing signal for successively switching between said plurality of taps for changing a delay of the chip-code signal with a second time delay.

9. The apparatus as set forth in claim 7 wherein:
said correlator means includes a first correlator and a second correlator, said first correlator operatively coupled to said input and to said switching means for generating a first correlator signal by correlating said spread-spectrum signal received at said input with said chip-code signal having the first time delay, said second correlator operatively coupled to said input and to said second switching device for generating a second correlator signal by correlating said spread-spectrum signal received at said input with said chip-code signal having the second time delay.

10. The apparatus as set forth in claim 7 wherein:
said comparator means includes a difference amplifier and first and second comparators, said difference amplifier and said first and second comparators operatively coupled to said correlator means for generating the comparator signals by comparing said first correlator signal with said second correlator signal.

11. A method using a chip-code generator, a plurality of shift registers, a first switching device, a second switching device, a first correlator, a second correlator, and a comparator, for adapting to receive a particular path, having the greatest amplitude, of a spread-spectrum signal with multipath, said spread-spectrum signal modulated by a chip-code signal, comprising the steps of:
generating with said chip-code generator the chip-code signal having the chip code of the spread-spectrum signal;
shifting with said shift registers the chip-code signal by a plurality of time delays;
changing with said first switching device, in response to a second comparator signal, a time delay of the chip-code signal with a first time delay;
changing with said second switching device, in response to a first comparator signal, a time delay of the chip-code signal with a second time delay;
correlating with said first correlator the spread-spectrum signal with the chip-code signal with the first time delay;
correlating with said second correlator the spread-spectrum signal with the chip-code signal with the second time delay; and
comparing with said comparator a first correlation signal from said first correlator with a second correlator signal from said second correlator and first and second thresholds to generate the first and second comparator signals.

12. A method using chip means, delay means, switching means, correlator means and comparator means, for adapting to receive a particular path, having the greatest amplitude, of a spread-spectrum signal with multipath, said spread-spectrum signal modulated by a chip-code signal, comprising the steps of:
generating with said chip means the chip-code signal having the chip code of the spread-spectrum signal;
shifting with said delay means the chip-code signal by a plurality of time delays;
changing with said switching means, in response to a comparator signal having a level less than a predetermined threshold, a time delay of the chip-code signal with a first time delay;
changing with said switching means, in response to the comparator signal having a level greater than a predetermined threshold, a time delay of the chip-code signal with a second time delay;
correlating with said correlator means the spread-spectrum signal with the chip-code signal with the first time delay;
correlating with said correlator means the spread-spectrum signal with the chip-code signal with the second time delay; and
comparing the a signal from said first correlator with a second correlation signal from said second correlator to generate the comparator signals.

* * * * *